Dec. 25, 1951     D. L. PERLMAN     2,579,696
FROZEN CONFECTION APPARATUS
Filed Aug. 2, 1948     2 SHEETS—SHEET 1
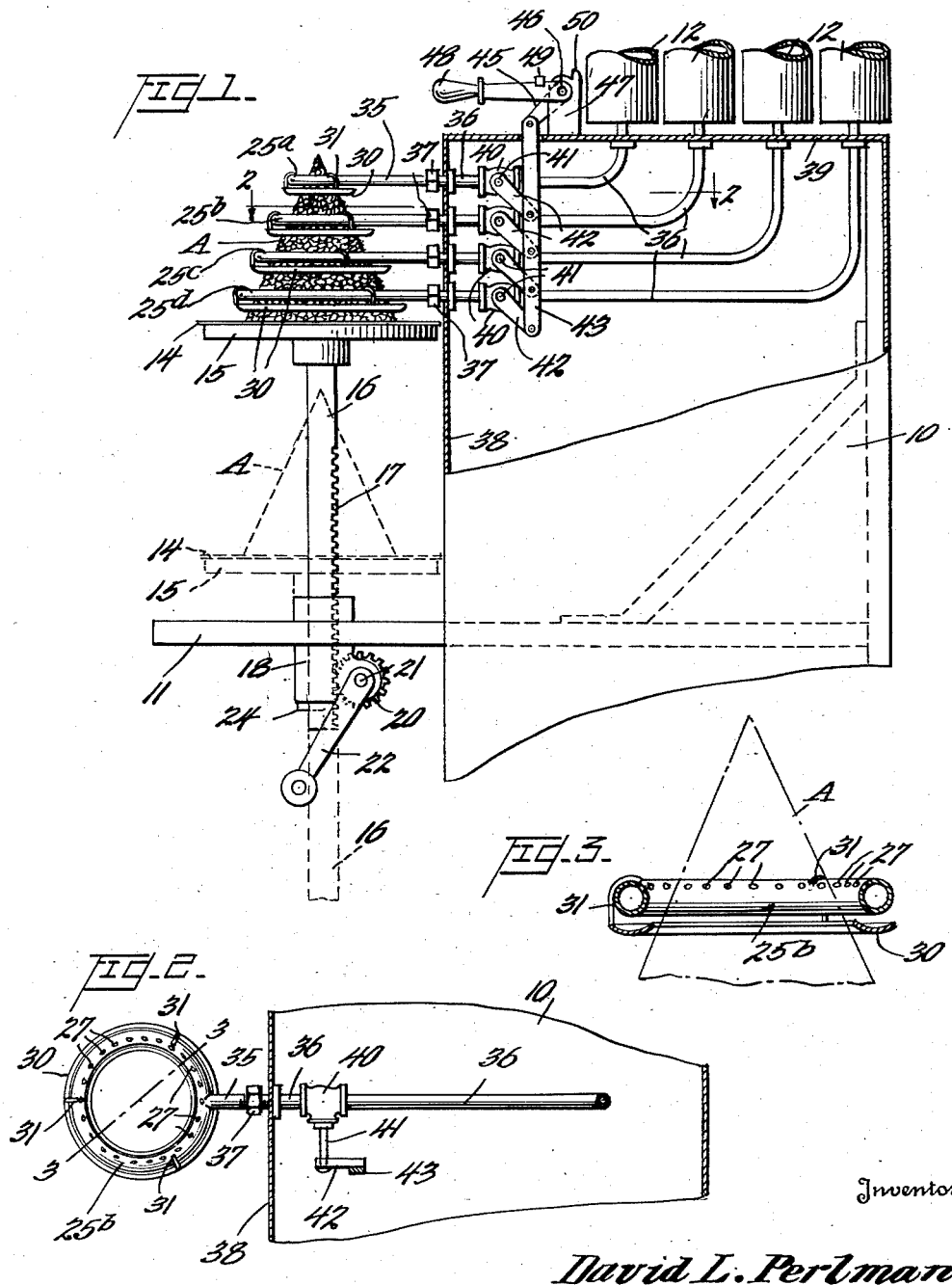
Inventor
David L. Perlman,
By Harold Strauss
ATTORNEY Dec. 25, 1951  D. L. PERLMAN  2,579,696
FROZEN CONFECTION APPARATUS
Filed Aug. 2, 1948  2 SHEETS—SHEET 2
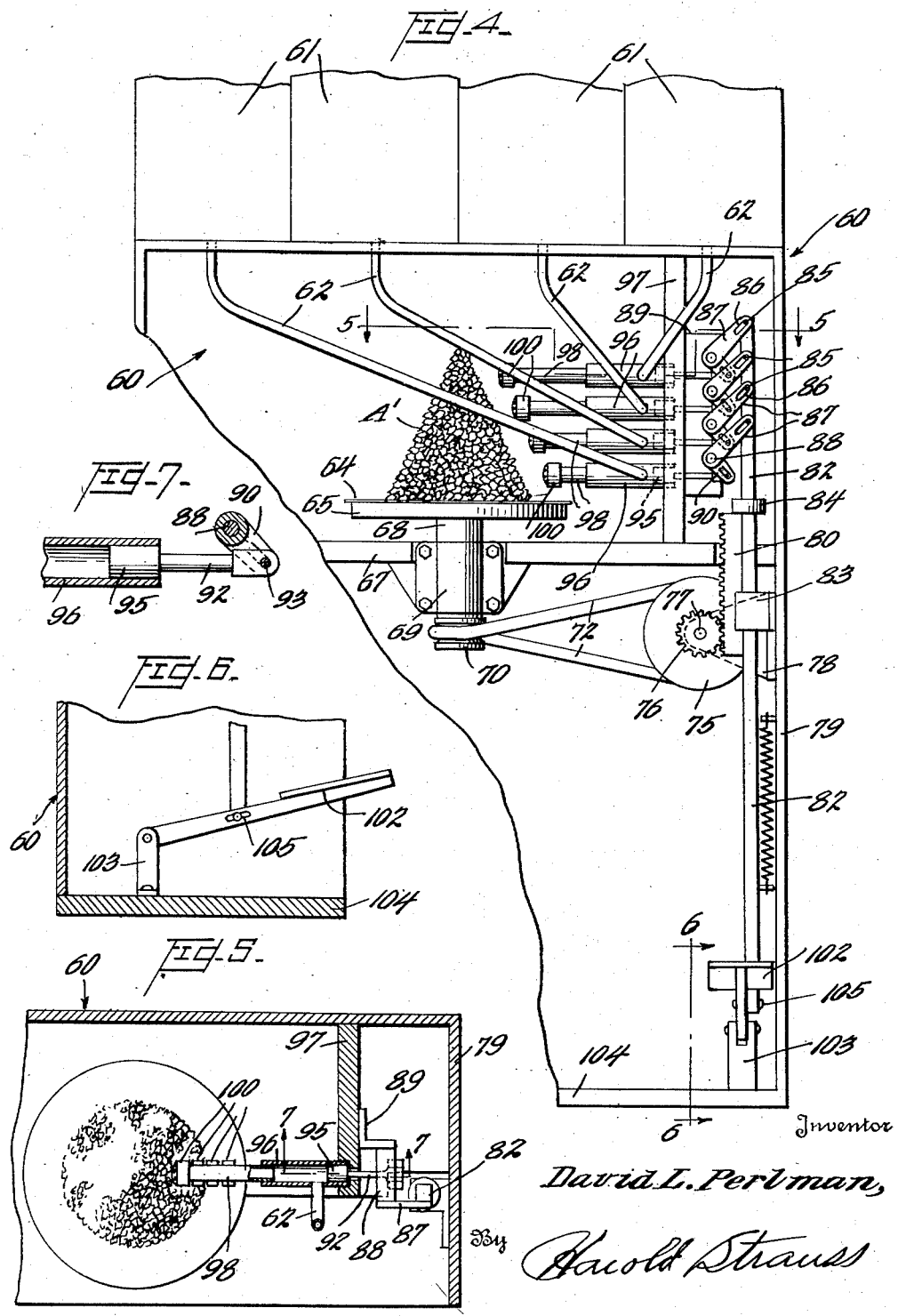
Inventor
David L. Perlman,
By Harold Strauss
ATTORNEY Patented Dec. 25, 1951

2,579,696

UNITED STATES PATENT OFFICE 2,579,696

FROZEN CONFECTION APPARATUS

David L. Perlman, Baltimore, Md.

Application August 2, 1948, Serial No. 42,105

6 Claims. (Cl. 107—1)

This invention relates to confections and more particularly to apparatus for preparing them.

The general object of the invention is the provision of novel apparatus relating to this art, and involved in the rapid, facile, and economical preparation of a novel frozen confection which is attractive and appealing in the matter of both taste and appearance.

In its preferred embodiments, the invention contemplates the provision of means for movably supporting a mass of frozen comestible such as plain shaved ice, sherbet, ice cream or the like, and means for bringing various portions of the mass into the spraying zone of a series of nozzles which are in communication with sources of various colored and flavored syrups.

Preferably, though not necessarily, the base material of the confection is shaved ice molded to a conical configuration. The apparatus may include operative means for rotating a platform supporting the material in the vicinity of a series of vertically spaced nozzles or jets each adapted to spray a predetermined annular portion of the cone with a particular colored flavoring fluid. Alternatively, there may be provided a vertically reciprocable platform with means for raising it axially into the spraying zone of a vertically spaced series of ring jets, whereby annular portions of the confection may be simultaneously covered or impregnated with the flavoring material.

In certain of the preferred forms of the invention, the same manually operable means is employed for actuating the spray nozzles and for moving the confection support.

Other objects and features of novelty will be apparent from the following specification when read in connection with the accompanying drawings in which certain embodiments of the invention are set forth by way of example.

In the drawings:

Figure 1 is a view in elevation of the essential portions of one machine for effecting the purpose of the invention, the confection in this case being raised into the zone of action of concentric graduated annular sprayers;

Figure 2 is a fragmentary view in horizontal section taken on line 2—2 of Fig. 1;

Figure 3 is a fragmentary vertical sectional view of one of the annular nozzles, as taken on line 3—3 of Fig. 2;

Figure 4 is a fragmentary view in elevation of another embodiment of the invention in which the confection is rotated in front of a series of stationary nozzles;

Figure 5 is a fragmentary horizontal sectional view taken on line 5—5 of Figure 4;

Figure 6 is a fragmentary sectional view taken on line 6—6 of Figure 4; and

Figure 7 is a fragmentary sectional view taken on line 7—7 of Figure 5.

Referring first to the form of the invention illustrated in Figures 1-3 inclusive, it will be seen that the novel confection preparing machine comprises a cabinet 10 and a supporting frame 11 projecting therefrom. Carried upon, or suitably housed within the cabinet are a series of refillable containers or reservoirs 12 for differently colored and flavored syrups for treating predetermined portions of the ice or other confections designated by the reference letter A.

The confection base A is by preference a cone of shaved ice which may be either freshly shaved by a shaving device having a conical receptacle, or it may be molded from a mass of the material in a conical cup made of paper, cardboard, plastic or other material, covering the open end with a sheet of waxed paper or paper plate 14 and inverting it upon the platform 15 while the latter is in its idle position shown in broken lines in Figure 1.

The platform 15 is supported upon the upper end of the vertical rod or shaft 16 which conveniently may be of squared cross-section and provided with rack teeth 17 on one face. The shaft 16 is vertically movable through a tubular embossment or bracket 18 carried by the framing 11. The bracket 18 carries a pinion 20 on stub shaft 21 to which is fixed a hand crank 22. The pinion 20 meshes with the teeth of the rack 17 and it will readily be perceived that when the handle 22 is manipulated, the platform 15 and its burden will be raised from the broken line position in Figure 1 to the upper position shown in solid lines, the set screw 24 limiting this upward movement by contacting the lower end of the bracket 18.

When in the upper position the "snow-ball" or confection A is disposed within the interior of a series of vertically spaced graduated annular nozzles 25a, 25b, 25c, and 25d. The diameters of the nozzle rings are increased in descending order so that the rings are substantially equally spaced from the conical walls of the confection A, and each is adapted to spray a distinctively colored and/or flavored extract or other liquid onto its particular juxtaposed area of the walls.

Each nozzle is toroidal in shape and is provided with a circular series of perforations 27 which are preferably directed slightly upwardly as well as radially inwardly, so as to overcome the force of gravity and give a proper trajectory to the jets. In order to catch any drip which might fall from the jets, as for example, due to the existence of the low-pressure conditions in the nozzles at the start and finish of the actuation of the nozzles, drip pans 30 may be provided, these pans or troughs being supported from the respective nozzles by means of the hooks or hangers 31.

The annular nozzles 25a-d are provided with nipples 35 which are coupled with the pipes 36 as at 37. The bent conduits 36 are supported in openings in the walls 38 and 39 of the cabinet 10, and lead from the tanks 12. Each conduit 36 has interposed in its length a cut-off valve 40. All of the valves 40 are provided with stems 41 carrying operating cranks 42 which are pivotally connected with a common link element 43. The link 43 is pivoted at its upper end to a crank arm 45 fixed to a shaft 46 rockably carried by a bracket 47 carried by the top wall 39 of the cabinet 10. A manually actuable handle or lever 48 is keyed to the rock shaft 46 and an abutment 49 carried by the lever 48, adapted to strike the abutment 50 on the bracket 47 to limit the movement of the various parts of the valve opening position.

The tanks or reservoirs 12 may either feed by gravity, or fluid pressure may be applied to the surface of the liquids therein to make the jet or spraying action more positive.

In the embodiment illustrated in Figures 4 to 7 of the drawings, the cabinet or support 60 supports the tanks or containers 61 from which the flavoring liquids flow, preferably under pressure, through the supply conduits 62.

The frozen confection base A' rests upon the paper sheet 64 carried by the platform 65. This platform is fixed as to vertical movement but is rotatably mounted upon the framing 67. For this purpose the platform has a depending member 68 which is rotatable in the bracket 69 carried by the frame member 67. A pulley 70 is carried by the lower end of the member 68 and is adapted to be turned by a belt 72 trained about the drive pulley 75. This latter pulley, together with the one-way pinion 76, is carried by a stub shaft 77, which is rotatably mounted in a bracket 78 secured to the cabinet wall 79. The one-way or over-running drive pinion 76 may be of any desired construction, for example, the central or hub-portion may be operatively connected to the rim portion by a pawl and ratchet drive or a ball and inclined plane drive, whereby the turntable or platform 65 may overrun the driving means for a purpose which will be made clear presently.

The teeth of the pinion 76 mesh at all times with those of the ratchet portion 80 of the vertical shaft 82. The shaft 82 is preferably of a square cross-section and is guided within the gibs or guide brackets 83 secured to the wall 79. A collar or enlargement 84 on the shaft limits the downward movement by contact with the brackets 83.

The upper portion of the shaft 82 is provided with a series of pins 85 which enter the slots 86 of the crank arms 87 carried by the pivots 88 on the bracket 89 fixed to the framework. The arms 87 constitute parts of bell cranks, the other arms 90 of which are operatively connected with the piston rods 92 by means of pin and slot connections 93. The rods 92 carry piston heads 95 on their outer ends, which piston heads work in the pump cylinders 96 which are supported in openings in the frame members 97.

Leading from the forward ends of the pump cylinders are the nipples 98 which carry nozzles 100 on their ends. The nipples 98 are of graduated lengths so that the respective nozzles are disposed at substantially equal distances from their respective adjacent portions of the conical surface of the confection A'. The supply conduits 62 open into the pump cylinders near the rear ends thereof as clearly shown in Figures 4 and 5.

The actuation of both the pumps and the turntable may be accomplished simultaneously by depressing the pedal 102 which is fulcrumed at one end to the bracket 103 supported upon the base element 104 of the frame 60. A pin and slot connection 105 connects an intermediate portion of the pedal 102 with the lower end of the shaft 82.

It will be readily perceived how the depression of the pedal 102, and thus the shaft 82 causes the cranks 87-90 to force the pistons 95 through the pump cylinders 96 spraying the liquid flavoring and coloring material through the nozzles 100 onto the ice A', and at the same time causes the rack element 80 to drive the overrunning pinion 76 and thus spin the turn-table or platform 65 and subject the entire periphery of the ice A' to the sprays. By means of the overrunning clutch the turn-table 65 may remain stationary while the pedal, shaft, and rack return to initial position.

Preferably, in both of the illustrated embodiments, the orifice 27 of the nozzles 25a-d, and those of the nozzles 100 may be made small enough to effectively atomize the syrup or flavoring so that it will impinge on the confection base as a fine spray; or alternatively air or inert gases may be mixed with the syrup to attain the same result.

It will be seen that by means of the apparatus described, a confection may be ornamented and flavored in a variegated pattern of horizontal layers or annular stripes, thus exerting an appeal particularly to the younger purchasers.

Various changes and alterations may be made in the embodiments illustrated and described herein without departing from the scope of the invention as defined in the following claims.

What I claim as new is:

1. In a device of the class described, means for supporting a frozen confection base in the form of a solid of revolution, a series of nozzle elements spaced lengthwise of the axis of the position adapted to be occupied by said base and also spaced laterally from said axis, each of said elements having at least one opening therein, said opening directed toward said axis, said position being within the range of discharge of said nozzles, means for supplying said nozzles with different colored fluid flavoring materials, means for discharging jets of said colored flavoring material through the opening of the respective nozzles onto the peripheral wall of said frozen confection base at different points therealong, means for moving said confection base so as to bring complete annular sections of the confection base within the range of the nozzles disposed along said axis and operative connections between said jet discharging means and said base moving means for attaining simultaneous operation of these means.

2. In a device of the class described, a tray adapted to support upon its upper surface a conical frozen confection base having a vertical axis, a series of vertically spaced nozzle elements, each having at least one opening directed toward the axis of said base, said openings being disposed at graduated distances from said axis, said distances increasing in the downward direction and being of such magnitude that said openings are each disposed substantially the same distance from the position of the conical side wall surfaces of the confection base, means for supplying said nozzles with different colored fluid flavoring materials, means for discharging a jet of said colored flavoring material through the openings of the respective nozzles onto the conical wall surfaces of the frozen confection base at different points along the height thereof, means for moving said supporting tray so as to bring complete annular sections of said confection base within the range of the nozzles disposed at the respective positions of said sections along the axis of said confection base and a common actuating means for said jet discharging means and said tray moving means.

3. In a device of the class described, a series of vertically spaced, horizontally directed fixed nozzles, means for supplying said nozzles each with a different kind of flavoring material, means for discharging said material through said nozzles in the form of substantially parallel vertically spaced jets, means for supporting a confection base in front of said series of nozzles within the range of discharge thereof, so that said jets may impinge upon said base, each at a different point along the height of said base, means for horizontally rotating said supporting means, and a common actuating means operatively connected to said discharging means and said rotating means for simultaneously operating these two means, whereby said confection base is supplied with different flavors at different horizontal circular zones.

4. The device as set forth in claim 3 in which the actuating means is adapted to move in alternating operating and return cycles, and a one-way transmission is interposed between said common actuating means and the rotating means, whereby during the return cycle of the actuating means the rotating means need not reverse.

5. In a device of the class described, a series of vertically spaced horizontally directed fixed nozzles, means for supplying said nozzles each with a different kind of colored flavoring material, single action, reciprocating pumping means for discharging said material through said nozzles in the form of substantially parallel vertically spaced jets, means for supporting a frozen confection base in front of said series of nozzles within the range of discharge thereof, so that said jets may impinge upon said base each at a different point along the height of said base, means for horizontally rotating said supporting means, whereby said confection is supplied with different flavors and colors at different horizontal circular zones, a common actuating means for the pumping means and the rotating means for the confection support, and a one-way transmission interposed between said common actuating means and said rotating means, whereby upon the return stroke of the pumping means the rotating means need not reverse.

6. The device set forth in claim 4 in which the common actuating means comprises a reciprocating member, means for manually reciprocating said member, a lever system connected between said member and said pumping means to reciprocate the pump through its pumping and return strokes upon similar reciprocation of said member, and in which the one-way transmission comprises a rack on said member, a pinion with a fixed axis meshing with said rack and an overrunning clutch interposed between said pinion and said rotating means.

DAVID L. PERLMAN.

REFERENCES CITED

The following references are of record in the file of this patent:

UNITED STATES PATENTS

| Number | Name | Date |
| --- | --- | --- |
| 358,358 | King et al. | Feb. 22, 1887 |
| 366,041 | Stauffer | July 5, 1887 |
| 660,717 | Barber et al. | Oct. 30, 1900 |
| 1,260,558 | Legler | Mar. 26, 1918 |
| 1,493,082 | Laskey | May 6, 1924 |
| 1,561,302 | Bausman | Nov. 10, 1925 |
| 1,725,608 | Zebulske | Aug. 20, 1929 |
| 1,761,132 | Lauhoff | June 3, 1930 |
| 1,869,464 | Clark | Aug. 2, 1932 |
| 1,898,148 | Snodgrass | Feb. 21, 1933 |
| 2,218,811 | Chaussabel | Oct. 22, 1940 |
| 2,366,944 | Veit | Jan. 9, 1945 |
| 2,418,190 | Overland | Apr. 1, 1947 |
| 2,451,096 | Kooman | Oct. 12, 1948 |